United States Patent
Chen et al.

(10) Patent No.: US 9,316,563 B2
(45) Date of Patent: Apr. 19, 2016

(54) METHOD OF TESTING IMAGE SENSOR AND RELATED APPARATUS THEREOF

(71) Applicant: PixArt Imaging Inc., Hsin-Chu (TW)

(72) Inventors: Ching-Chih Chen, Hsin-Chu (TW); Ren-Hau Gu, Hsin-Chu (TW); Chih-Yen Wu, Hsin-Chu (TW); Yao-Hsuan Lin, Hsin-Chu (TW); Tzu-Yu Chen, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 324 days.

(21) Appl. No.: 13/875,307

(22) Filed: May 2, 2013

(65) Prior Publication Data

US 2014/0097330 A1  Apr. 10, 2014

(30) Foreign Application Priority Data

Oct. 4, 2012  (TW) .............................. 101136660 A

(51) Int. Cl.
*G01M 11/00* (2006.01)
*H04N 17/02* (2006.01)
*H04N 1/00* (2006.01)
*H04N 17/00* (2006.01)

(52) U.S. Cl.
CPC .............. *G01M 11/00* (2013.01); *H04N 1/0005* (2013.01); *H04N 1/00021* (2013.01); *H04N 1/00039* (2013.01); *H04N 1/00074* (2013.01); *H04N 17/002* (2013.01)

(58) Field of Classification Search
CPC ............ H04N 1/00039; H04N 1/0005; H04N 1/00074; H04N 1/00047
See application file for complete search history.

(56) References Cited

U.S. PATENT DOCUMENTS

| 6,819,358 | B1 * | 11/2004 | Kagle et al. .................... | 348/246 |
|---|---|---|---|---|
| 8,081,682 | B1 | 12/2011 | Carbacea | |
| 2002/0008715 | A1 * | 1/2002 | Sorek et al. .................... | 345/698 |
| 2002/0080253 | A1 * | 6/2002 | Kim .............................. | 348/246 |
| 2003/0007081 | A1 * | 1/2003 | Kwon et al. .................... | 348/247 |
| 2003/0222995 | A1 * | 12/2003 | Kaplinsky et al. ............. | 348/247 |
| 2005/0010621 | A1 * | 1/2005 | Pinto et al. .................... | 708/200 |
| 2006/0126136 | A1 * | 6/2006 | Satou et al. .................... | 358/504 |
| 2006/0152607 | A1 * | 7/2006 | Noguchi ........................ | 348/248 |
| 2007/0030365 | A1 * | 2/2007 | Jerdev ........................... | 348/241 |
| 2007/0229666 | A1 * | 10/2007 | Berestov et al. .............. | 348/187 |
| 2008/0055434 | A1 * | 3/2008 | Ovsiannikov ................. | 348/246 |
| 2008/0239114 | A1 | 10/2008 | Shin | |
| 2009/0109305 | A1 * | 4/2009 | Dai et al. ....................... | 348/245 |
| 2013/0020467 | A1 * | 1/2013 | Johnson ..................... | 250/208.1 |
| 2013/0070140 | A1 * | 3/2013 | Gove et al. .................... | 348/302 |

FOREIGN PATENT DOCUMENTS

| CN | 101277385 A | 10/2008 |
|---|---|---|
| EP | 0 763 949 B1 | 11/2005 |
| TW | 201216207 | 4/2012 |
| TW | 201233158 | 8/2012 |
| TW | 201234843 | 8/2012 |

* cited by examiner

*Primary Examiner* — Brian Yenke
(74) *Attorney, Agent, or Firm* — Winston Hsu; Scott Margo

(57) ABSTRACT

A method of testing an image sensor having a plurality of sensing units includes: utilizing the image sensor to generate a plurality of sensing results respectively corresponding to a plurality of captured images, wherein each sensing result includes a plurality of sensing values respectively generated by the sensing units; and generating a testing result which indicates a performance of the image sensor according to changing of the sensing results.

14 Claims, 8 Drawing Sheets

| X1 | X2 | X3 (50) |
|----|----|---------|
| X4 | X5 | X6 |
| X7 | X8 | X9 |

FR2

| X1 | X2 | X3 (160) |
|----|----|----------|
| X4 | X5 | X6 |
| X7 | X8 | X9 |

FR3

| X1 | X2 | X3 (40) |
|----|----|---------|
| X4 | X5 | X6 |
| X7 | X8 | X9 |

FR4

| X1 | X2 | X3 (120) |
|----|----|----------|
| X4 | X5 | X6 |
| X7 | X8 | X9 |

FR5

| X1 | X2 | X3 (130) |
|----|----|----------|
| X4 | X5 | X6 |
| X7 | X8 | X9 |

FIG. 4

| RR1 | | |
|---|---|---|
| X1 | X2 | X3(I) |
| X4 | X5 | X6 |
| X7 | X8 | X9 |

| RR2 | | |
|---|---|---|
| X1 | X2 | X3(II) |
| X4 | X5 | X6 |
| X7 | X8 | X9 |

| RR3 | | |
|---|---|---|
| X1 | X2 | X3(I) |
| X4 | X5 | X6 |
| X7 | X8 | X9 |

| RR4 | | |
|---|---|---|
| X1 | X2 | X3(II) |
| X4 | X5 | X6 |
| X7 | X8 | X9 |

| RR5 | | |
|---|---|---|
| X1 | X2 | X3(II) |
| X4 | X5 | X6 |
| X7 | X8 | X9 |

FIG. 5

METHOD OF TESTING IMAGE SENSOR AND RELATED APPARATUS THEREOF

BACKGROUND OF THE INVENTION

1. Field of the Invention

The disclosed embodiments of the present invention relate to optical sensing, and more particularly, to a testing method for testing the performance of an image sensor and related apparatus thereof.

2. Description of the Prior Art

Optical navigation system tracks the movement of the optical navigation system in a real-time manner based on the image sensing technology, to determine a user's specific manipulation action. The most important component in the optical navigation system is the image sensor which includes arrays composed by a large number of sensor components and captures successive pictures as a basis for the motion tracking. Therefore, the performance of the image sensor becomes an important factor affecting the performance of the optical navigation system.

In general, while testing an image sensor, the testing standard usually confines to damage of the sensing units. Once a pixel can not respond appropriately to changes in the brightness of the scene, the corresponding sensing unit is determined to be defective, and thus the image sensor is judged as defective. However, such a testing method is not comprehensive, and fails to evaluate the extent of performance of the image sensor.

Under this premise, when manufacturers utilize image sensors to produce optical navigation systems, the performance of the optical navigation system can not be known in the design stage. Usually, the performance of the optical navigation system is not known until a few of test products are produced. At that moment, the performance of the optical navigation system can be determined according to the user experiences through user simulation tests, and the need to re-design/tune a portion of the circuit or algorithm would be considered. However, this process is time-consuming and laborious.

SUMMARY OF THE INVENTION

With this in mind, one of the objectives of the present invention is to provide a testing method for testing an image sensor and related apparatus thereof. With the use of the present invention, a standard for measuring the merits of the performance of the image sensor is obtained. Another objective of the present invention is to provide a mechanism for tuning the image sensor. The mechanism first tests the merits of the performance of the image sensor. Next, the relevant parameters of the image sensor are set in accordance with the test results. In this way, the optimized performance of the image sensor is obtained before the image sensor is employed in a specific application. Thus, the following specific application which is based on the image sensor becomes more efficient.

According to a first aspect of the present invention, a method of testing an image sensor is disclosed. The method of testing an image sensor having a plurality of sensing units includes: utilizing the image sensor to generate a plurality of sensing results respectively corresponding to a plurality of captured images, wherein each sensing result includes a plurality of sensing values respectively generated by the sensing units; and generating a testing result which indicates a performance of the image sensor according to changing of the sensing results.

According to a second aspect of the present invention, a testing apparatus for testing an image sensor is disclosed. The testing apparatus for testing an image sensor, wherein the image sensor has a plurality of sensing units, the image sensor generates a plurality of sensing results corresponding to a plurality of captured images respectively, wherein each sensing result includes a plurality of sensing values respectively generated by the sensing units, the sensing apparatus includes a memory unit and a numerical analysis unit. The memory unit is arranged for storing the sensing results. The numerical analysis unit is coupled to the memory unit, arranged for generating a testing result which indicates the performance of the image sensor according to changing of the sensing results.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a diagram illustrating the scope of the testing method shown in FIG. 1.

FIG. 4 is another diagram illustrating the scope of the testing method shown in FIG. 1.

FIG. 5 is yet another diagram illustrating the scope of the testing method shown in FIG. 1.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

The method of the present invention performs detection upon reactions of the image sensor in a static scene and a dynamic scene respectively. First of all, the reactions for detection of dynamic scenes will be described in the following. The dynamic scene is where the scene of the effective sensing area of the image sensor varies with time. The changes of the sensing result have to be able to faithfully reflect the changes of the scene. In order to carry out the reaction for the detection of dynamic scenes, the present invention changes the content of the scenes in the effective sensing area of the image sensor, and then analyzes whether the variation of the sensing result is sufficiently ideal or not.

Figure 1:
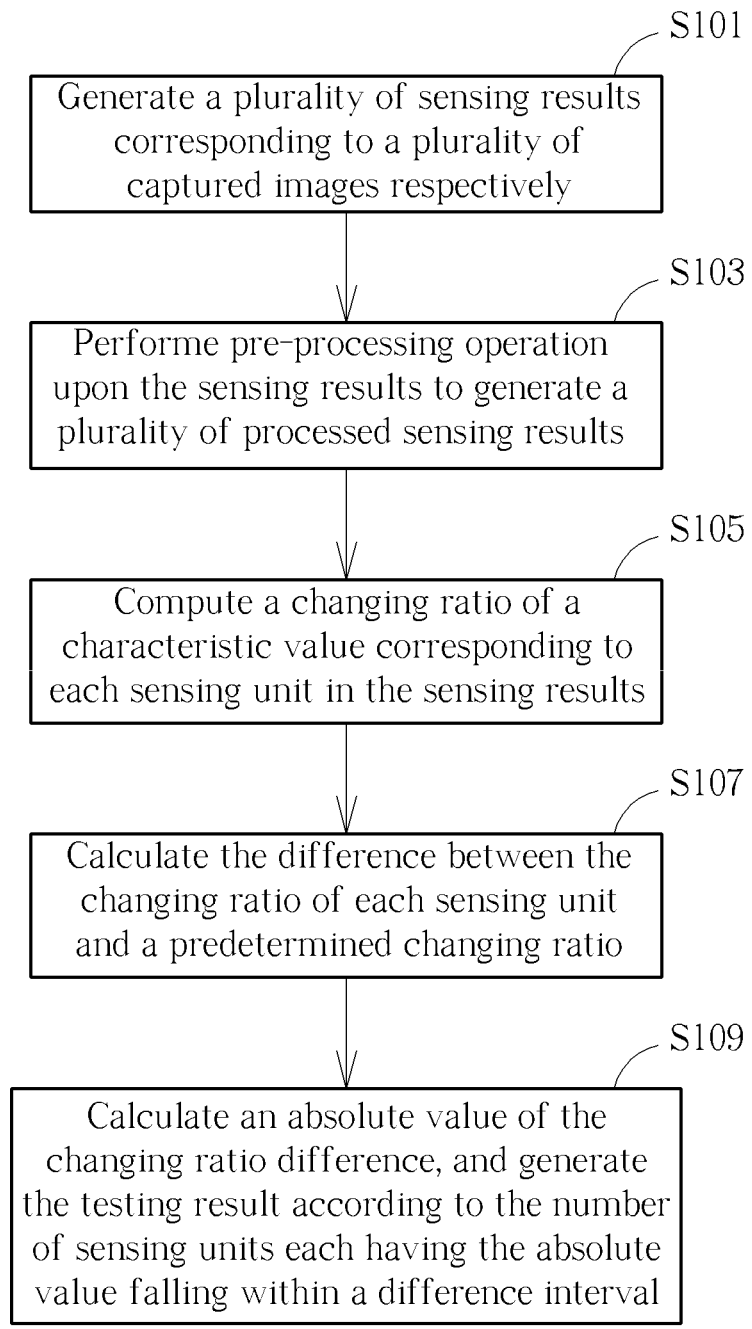
FIG. 1 is a flowchart illustrating a testing method according to an embodiment of the present invention.
Figure 2:
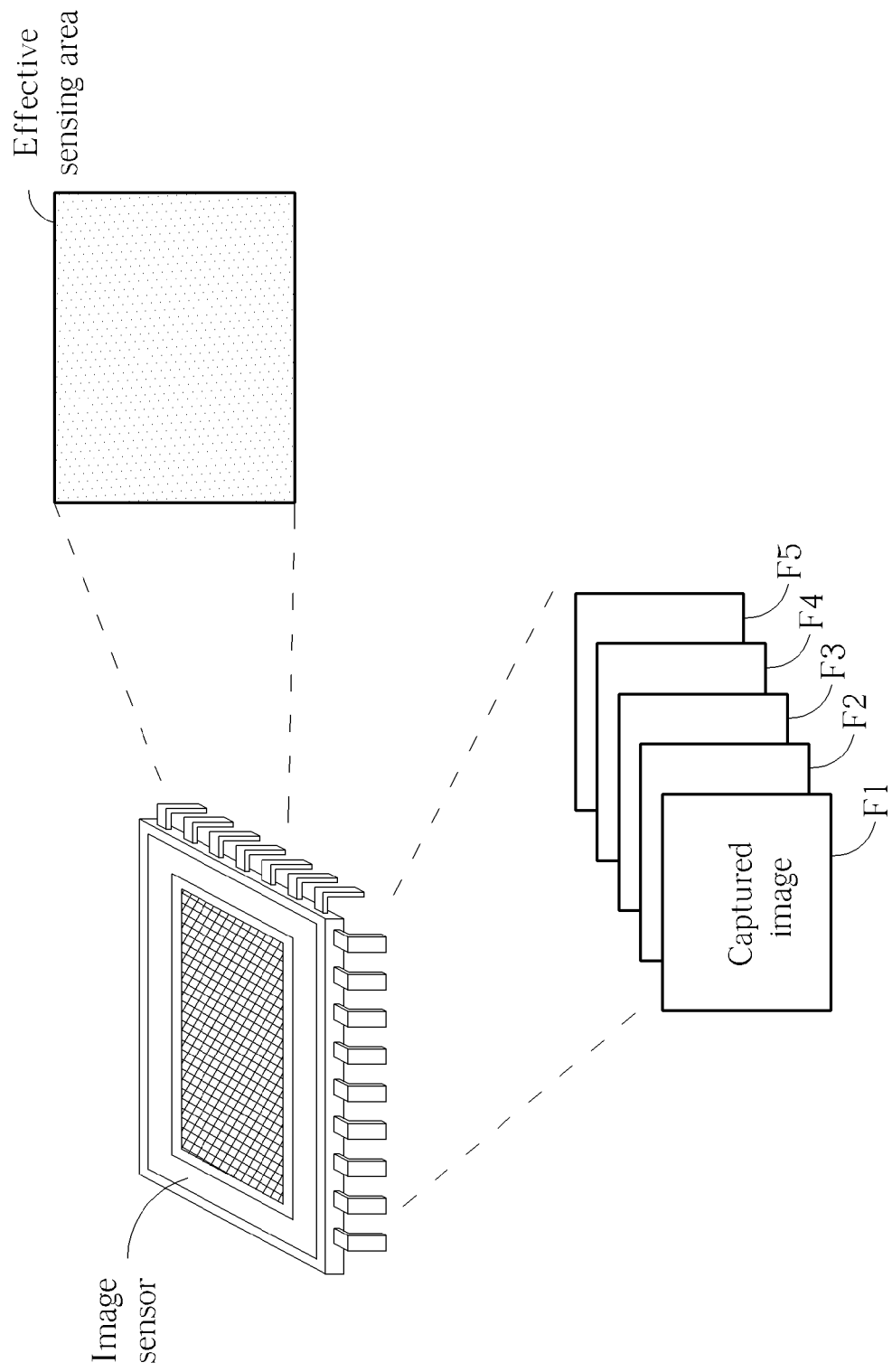
FIG. 2 is a diagram illustrating a testing method according to an embodiment of the present invention.

Please refer to FIG. 1 for a detailed flow. First, in step S101, an image sensor is utilized to perform image capturing for dynamic scenes, thereby generating a plurality of sensing results corresponding to a plurality of captured images respectively, wherein each of the sensing results includes a plurality of sensing values generated from the sensing units respectively. As to a further example, please refer to FIG. 2, wherein the image sensor generates captured images F1-F5 for dynamic scenes. In this embodiment, so-called image capturing for dynamic scenes can be achieved by sensing different areas of a wide-range background. However, any implementation having the same effect also belongs to the scope of the present invention.

Figure 3:
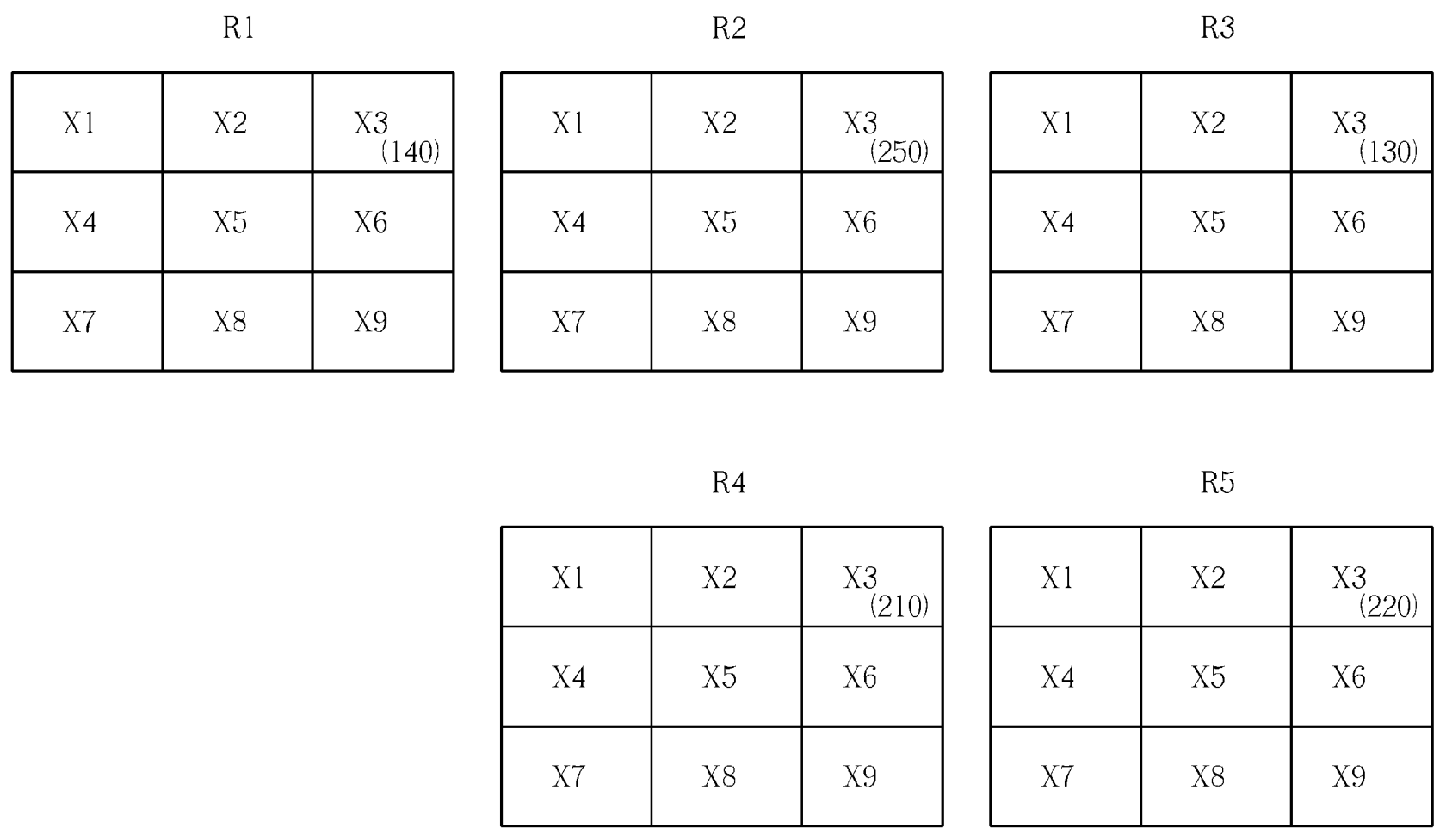

FIG. 3 is a diagram illustrating a plurality of sensing results R1-R5 corresponding to the captured images F1-F5 respectively, wherein X1-X9 represent different pixels in the captured images F1-F5 respectively, and the luminance value of each pixel is determined by a sensing value of a specific sensing unit. In step S101, a plurality of sensing results (e.g., R1-R5) corresponding to a plurality of captured images (e.g., F1-F5) can be obtained respectively. Please note that, in order to simplify the description, only small-sized images, each composed of 3×3 pixels, are used for an example in the following paragraphs. However, one skilled in the art should readily understand that the concept of the present invention may be extended to images of any sizes to practice the testing method of the present invention after fully understanding technical features described in the following description. Further, in order to embody this inventive concept, specific numerical values are used in the following description to aid the reader in understanding technical features of the present invention. However, these specific values of the present invention should not be deemed as physical constraints/limitations of the present invention.

Next, in step S103, a pre-processing operation is performed upon the sensing results R1-R5 to generate a plurality of processed sensing results RR1-RR5, wherein each of the processed sensing results RR1-RR5 has a plurality of characteristic values corresponding to the sensing units respectively. In one embodiment, the pre-processing operation further includes a filtering process and a binarization process. In the example of FIG. 4, the sensing results FR1-FR5 are generated through performing the filtering process upon the original sensing results R1-R5, wherein the luminance values of the pixel X3 are adjusted to 50, 160, 40, 120, and 130 from 140, 250, 130, 210, and 220 through the filtering process, and the filtering process may include an offset elimination process. At the end of the filtering process, the binarization process will be further performed to classify the luminance values into two different types of characteristic values. When a pixel corresponds to different characteristic values in two consecutive captured images respectively, it means that the sensing unit corresponding to the pixel is able to operate in response to dynamic scenes. The binarization process will select a threshold value. Hence, when the luminance value is larger than the threshold value, the luminance value is classified as one characteristic value, and when the luminance value is not larger than the threshold value, the luminance values is classified as another characteristic value. In the example of FIG. 5, the luminance values at the pixel X3 in the sensing results FR1-FR5 are 50, 160, 40, 120, and 130, and are processed by the binarization process to be classified as characteristic values I, II, I, II, and II in the sensing results RR1-RR5s. Please note that, how to select the threshold value is not the focus of the present invention, and thus the setting of the threshold value is not specifically indicated in the above examples. In addition, although only the filtering process and the binarization process are referred in the above description for the pre-processing operation, the pre-processing operation in other embodiments of the present invention, however, may further include other processing steps which can help to enhance the correction of the testing result.

After step S103 is accomplished, the characteristic values associated with the corresponding sensing units may be determined by the characteristic values of the pixel. When the flow proceeds to step S105, a changing ratio of a characteristic value corresponding to each sensing unit in the sensing results is computed. Taking the image scope of FIG. 4 for example, the pixel X3 corresponds to the characteristic values I, II, I, II, and II respectively in different sensing results RR1-RR5. Hence, it can be found that the number of occurrence of significant changes in the luminance value of the pixel X3 is 3, and the percentage is 75% correspondingly. That is, the changing ratio of the characteristic value of the sensing unit corresponding to the pixel X3 is 75%. After a changing ratio of the characteristic value of each sensing unit is calculated through step S105, the flow proceeds to step S107 to analyze the statistical result of these changing ratios.

The principles of the analysis are as follows. Due to that the scene sensed by the image sensor is dynamic in the present process, each sensed image is constantly changing. Therefore, in a reasonable situation, the ideal changing ratio of the characteristic value of each of the sensing units may be assumed to be 50%. As can be known from the example of FIG. 5, the pixel X3 changes 3 times during 4 scene changes (five captured images F1-F5), and the changing ratio 75% is therefore higher than the desired changing ratio 50% by 25%. By this manner, the step S107 may calculate the difference between the changing ratio of each sensing unit and a predetermined changing ratio (e.g., 50%), and may generate a changing ratio difference (e.g., 25%) corresponding to the sensing unit. In fact, although the above-mentioned changing ratio difference is up to 25%, it still falls within an acceptable range. Actually, the worst case should be any sensing unit totally having no response to dynamic scenes (e.g., a sensing unit having a corresponding characteristic value with 0% changing ratio), or any abnormal sensing unit which always changes (e.g., a sensing unit having a corresponding characteristic value with 100% changing ratio). In order to find such a sensing unit, the step S109 will calculate an absolute value of the changing ratio difference, and generate the testing result according to the number of sensing units each having the absolute value falling within a difference interval (e.g., 50%). In above example, the number of sensing units each having a changing ratio equal to 0% or 100% is calculated as the testing result. But it should be noted that the above-identified difference interval is not meant to be a limitation of the present invention. For instance, although the above difference interval is chosen as 50%, that is, sensing units with 0% or 100% changing ratio will be counted in the calculation, a different difference interval (e.g., 40%) maybe chosen in another embodiment. At this moment, sensing units with 10% or 90% changing ratio will be counted in the calculation. Further, it is also possible to simultaneously select a plurality of difference intervals, such that sensing units each having the changing ratio 0%-10% or 90%-100% are counted in the calculation.

When step S107 is accomplished, the number of defective sensing units in the image sensor can be obtained. In most cases, an image sensor with fewer defective sensing units will be evaluated as having better performance. With the help of this indicator, the parameter setting of the circuit of the image sensor can be further adjusted. The effect resulting from the current parameter adjustment can be known by observing the change of numbers of defective sensing units before and after adjusting a certain parameter (e.g., contrast) of the image sensor. Next, based on the observed result of the current parameter adjustment/tuning, how to perform the following parameter adjustment/tuning can be decided.

Another embodiment of the disclosed method of the present invention provides a response test for static scenes. A static scene means that the scene in the effective sensing area is time invariant. Therefore, the stability of the image sensor relates to the response performance for static scenes. That is, whether the sensing result can remain constant would determine the stability of the image sensor. For doing this test, the present invention maintains the content of the testing area of the image sensor to be constant, and then analyzes the change of the sensing result to determine the response performance for static scenes.

Figure 6:
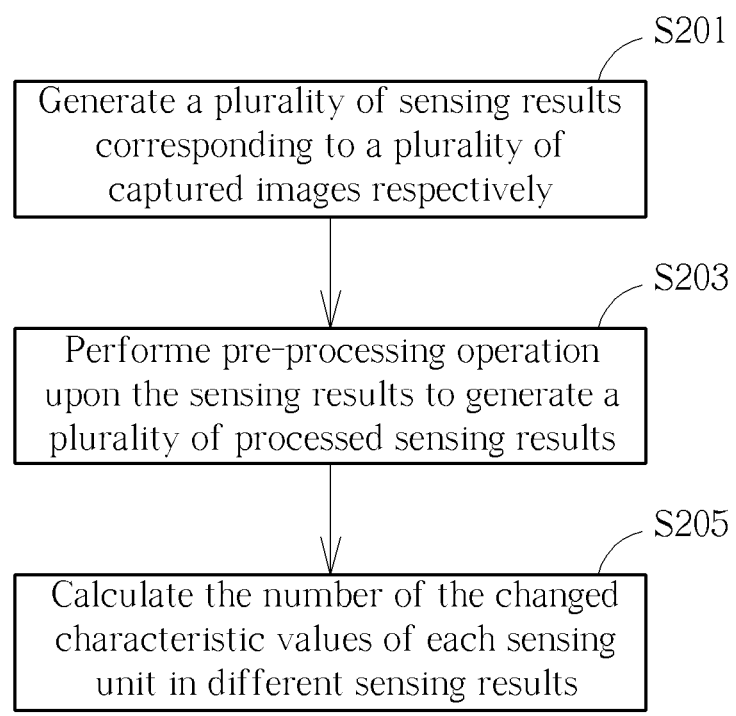
FIG. 6 is a flowchart illustrating a testing method according to another embodiment of the present invention.

Please refer to FIG. 6, which is flowchart illustrating a method according to another embodiment of the present invention. First, due to that the operations performed in steps S201 and S203 are substantially identical to that performed in steps S101 and S103 as described in above description, further details are omitted here for brevity. It should be noted that the major difference between steps S201 and S101 is that, although a plurality of captured images F1-F2 are generated in step S201, these captured images are generated based on the same stationary background rather than generated by sensing different areas in a large-range background in the previous embodiment. Please note that the number of captured images is not a limitation of the present invention. Particularly, in the testing process for a static scene, only two captured images are needed to complete the testing for a static scene. Next, in step S203, a pre-processing operation will be performed upon the sensing results R1-R2 of the captured images F1-F2, to determine the corresponding characteristic values of each of the sensing units in the different captured images F2-F2.

Figure 7:
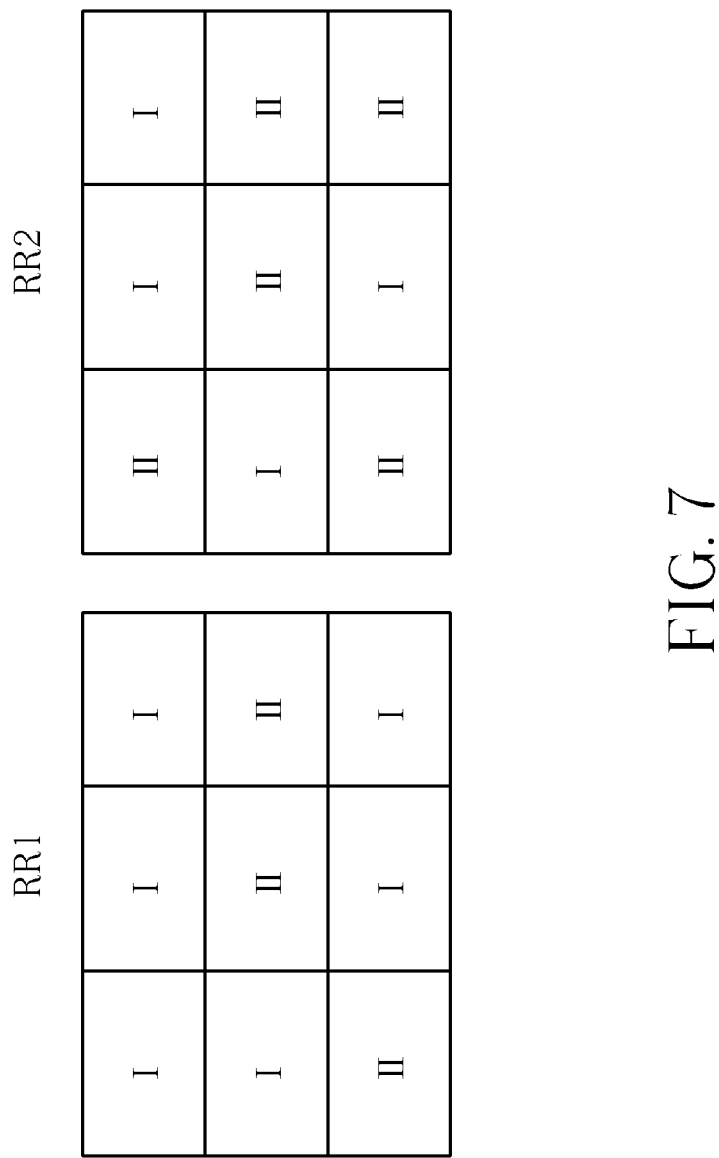
FIG. 7 is a diagram illustrating the scope of the testing method shown in FIG. 6.

After the pre-processing operation in step S203 is accomplished, the characteristic values of each sensing unit in different sensing results can be obtained. Next, the changing of the characteristic values of each sensing unit in different sensing results is further analyzed in the step S205. As mentioned earlier, what is concerned is whether the sensing result remains invariant/constant in the response test of the static scene, so any sensing unit with a changing characteristic value is considered defective. Therefore, the performance of the image sensor can be evaluated by calculating the number of defective sensing units. In one embodiment, the method only needs to find out the number of sensing units with changing characteristic values in the sensing results corresponding to two consecutive captured images. As to a detailed example, please refer to FIG. 7. As shown in FIG. 7, in the sensing results RR1 and RR2 generated by the pre-processing operation, only pixels located at the upper left corner and lower right corner have changed characteristic values. Hence, it can be known that the sensing performance of the corresponding sensing units for static scenes is not ideal. Thereafter, after the number of all defective image components in the image sensor is obtained, the testing result can be accordingly obtained. However, it can be seen in the previous description directed to obtaining the captured images, the method of the present invention actually performs image sensing for the same background. Therefore, in one embodiment of the present invention, the steps S201 and 203 may be repeated to produce a plurality of testing results for different backgrounds. In this way, regarding a specific background, whether the performance of the image sensor is higher or lower than a standard level can be known. In addition, the method determines a predetermined number as an evaluation level, where this predetermined number is generated by the above-mentioned testing process for the specific background. In this way, it will be known that for which kind of background the image sensor will have better sensing performance.

Figure 8:
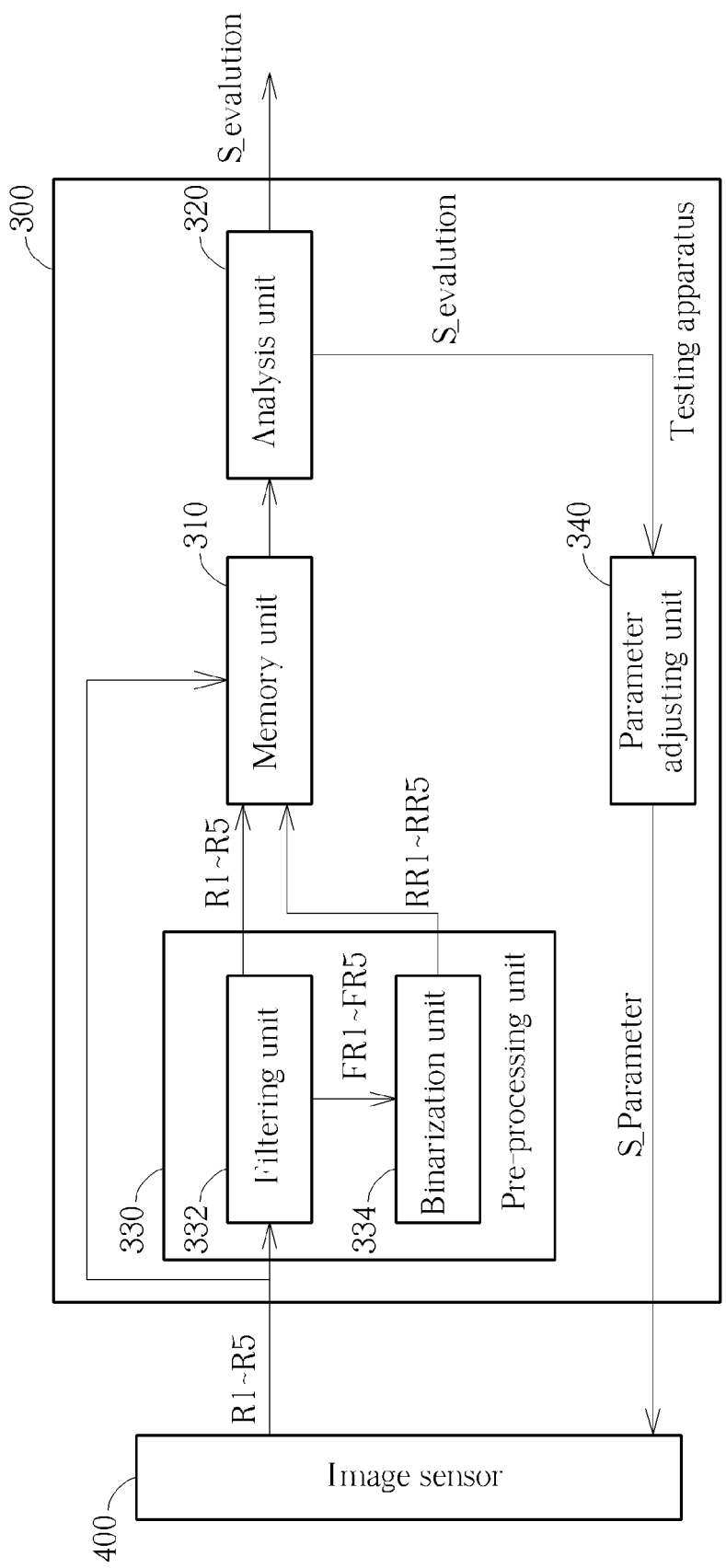
FIG. 8 is a functional block diagram illustrating a testing apparatus according to an embodiment of the present invention.

In another embodiment of the present invention, a testing apparatus based on the above testing methods is provided, such as that shown in FIG. 8. The image sensor 400 generates a plurality of sensing results R1-R5 corresponding to a plurality of captured images F1-F5 respectively, wherein each sensing result includes a plurality of sensing values generated by the sensing units respectively. The sensing apparatus 300 includes a memory unit 310 and a numerical analysis unit 320. The memory unit 310 is arranged for storing the sensing results R1-R5, or other results obtained from the sensing results R1-R5, and the memory unit 310 may be a register or a storage device with any other type. The numerical analysis unit 320 is coupled to the memory unit 310, and is arranged for generating a testing result S_evalution indicative of the performance of the image sensor 400 according to changing of the sensing results R1-R5. In order to carry out a pre-processing operation as that performed in the step S103 and the step S203, the testing apparatus 310 further includes a pre-processing unit 330. The pre-processing unit 330 is coupled to the memory unit 310, and is arranged for performing a pre-processing operation upon the sensing results R1-R5, to thereby generate a plurality of processed sensing results RR1-RR5. The pre-processing unit 330 may directly apply the pre-processing to the sensing results R1-R5 generated from the image sensor 400. Alternatively, the sensing results R1-R5 may be stored in the memory unit 310 first, and then read from the memory unit 310 for pre-processing. The pre-processing unit 330 includes a filtering unit 332 and a binarization unit 334, where the filtering unit 332 is arranged for performing a filtering process upon the sensing results R1-R5. The binarization unit 334 is coupled to the filtering unit 332, and arranged for performing a binarization process upon the sensing results FR1-FR5 which are outputted from the filtering unit 332, and accordingly generating the sensing results RR1-RR5. Please note that, in addition to the filtering unit 332 and the binarization unit 334, the pre-processing unit 330 may further include other processing units which may help to enhance the accuracy of the testing result.

The testing apparatus 300 can be used to implement the response testing process of dynamic scenes, such as that shown in FIG. 1, or the response testing process of static scenes, such as that shown in FIG. 6. When the testing apparatus 300 is used for performing the response testing of dynamic scenes, the numerical analysis unit 320 may calculate a changing ratio of a corresponding characteristic value of each sensing unit in the sensing results RR1-RR5, and calculate the difference between the changing ratio and a predetermined ratio (e.g., 50%). Next, the numerical analysis unit 320 would generate a changing ratio difference corresponding to the sensing unit, and calculate an absolute value of the changing ratio difference. Finally, the numerical analysis unit 320 generates a testing result S_evulation according to the number of sensing units each having the corresponding absolute value falling within a difference interval. The testing result S_evulation indicates the number of defective sensing units in the image sensor 400, and the parameter setting of the image sensor 400 can be further adjusted. By using a parameter adjusting unit 340, the changing of the corresponding testing result S_evulation before and after adjusting a certain parameter of the image sensor can be observed. In this way, a proper setting value S_parameter of the parameter can be found.

When the testing apparatus 300 is used for performing the response test of static scenes, the numerical analysis unit 320 would calculate the number of sensing units, each having a corresponding characteristic value in a specific sensing result (e.g., RR2) different from another corresponding characteristic value in a previous specific sensing result (e.g., RR1), and generate the testing result S_evulation according to the calculated number. In one embodiment, the numerical analysis unit 320 may further compare the calculated number with a predetermined number to generate the testing result S_evulation; in this case, the testing result S_evulation may indicate whether the sensing performance of the image sensor 400 is higher or lower than a standard level. Further, the predetermined number may be generated from performing the above process upon the same scene by the testing apparatus 300 in advance. Similarly, the testing result S_evulation of testing the sensing performance for static scenes may be used for tuning/adjusting the parameter setting of the image sensor 400. Hence, a proper setting value S_parameter of the parameter can be found through the parameter adjusting unit 340.

The text "one embodiment" mentioned above represents a particular feature, structure, or characteristic of this embodiment as described is included in at least one embodiment of the present invention. Furthermore, the text "one embodiment" does not represent the same embodiment in different paragraphs. Although different structural features or methods are respectively mentioned in different embodiments described above, it should be noted that these different characteristics may be implemented in the same particular embodiment through appropriate modifications.

In summary, by means of the disclosed testing method of the present invention, performance test and evaluation can be done for an image sensor beforehand to know the actual performance of the image sensor. In this way, the efficiency of designing and tuning optical navigation systems or other application devices based on the image sensor can be greatly enhanced. In addition, the testing method of the present invention provides a quantitative performance standard of the image sensors, and with this quantitative performance standard, a more reliable and accurate reference can be obtained while performing image sensor optimization.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of testing an image sensor having a plurality of sensing units, comprising:
   utilizing the image sensor to capture at least a dynamic scene to generate a plurality of sensing results corresponding to a plurality of captured images respectively, wherein each of the sensing results includes a plurality of sensing values generated by the sensing units respectively; and
   generating a testing result indicative of performance of the image sensor according to changing of the sensing results, wherein the test result records a number of defective sensing units each having a significant change ratio exceeds a threshold, and the significant change ratio of one sensing unit is a number of times that a significant change in the sensing values corresponding to successive captured images happens to a given number of the captured images, wherein the step of generating the testing result indicative of performance of the image sensor according to changing of the sensing results comprises:
   performing a pre-processing operation upon the sensing results to generating a plurality of processed sensing results, wherein each of the processed sensing results comprises a plurality of characteristic values corresponding to the sensing units respectively; and
   generating the testing result indicative of performance of the image sensor according to changing of the characteristic values, comprising:
   for each of the sensing units:
   calculating a changing ratio of a characteristic value corresponding to the sensing unit in the sensing results; and
   generating the testing result according to a number of sensing units each having a corresponding changing ratio falling within a specific interval, comprising:
   for each of the sensing units:
   calculating a difference between the changing ratio and a predetermined ratio to generate a ratio difference corresponding to the sensing unit; and
   calculating an absolute value of the ratio difference; and
   generating the testing result according to a number of sensing units each having a corresponding absolute value falling within a difference interval.

2. The method of claim 1, wherein the step of performing the pre-processing operation upon the sensing results comprises:
   performing a filtering process upon the sensing results;
   performing a binarization process upon the sensing results processed by the filtering process to generate the processed sensing results.

3. The method of claim 1, wherein the step of generating the testing result comprises:
   calculating a number of sensing units each having a corresponding characteristic value in a specific sensing result which is different from a corresponding characteristic value in a previous specific sensing result; and
   generating the testing result according to the calculated number.

4. The method of claim 3, wherein the step of generating the testing result according to the number comprises:
   generating the testing result according to the calculated number and a predetermined number.

5. The method of claim 1, wherein the step of generating the sensing results comprises:
   moving the image sensor to allow the image sensor to perform image capturing upon different areas respectively to generate the sensing results.

6. The method of claim 1, wherein the step of generating the sensing results comprises:
   fixing the image sensor to allow the image sensor to perform image capturing upon a same area to generate the sensing results.

7. The method of claim 1, further comprising:
   adjusting a setting value of the image sensor according to the testing result.

8. A testing apparatus for testing an image sensor, wherein the image sensor has a plurality of sensing units, the image sensor captures at least a dynamic scene to generate a plurality of sensing results corresponding to a plurality of captured images respectively, and each of the sensing results includes a plurality of sensing values generated by the sensing units respectively, the testing apparatus comprising:

a memory unit, arranged for storing the sensing results;

a numerical analysis unit, coupled to the memory unit, the numerical analysis unit arranged for generating a testing result indicative of performance of the image sensor according to changing of the sensing results, wherein the test result records a number of defective sensing units each having a significant change ratio exceeds a threshold, and the significant change ratio of one sensing unit is a number of times that a significant change in the sensing values corresponding to successive captured images happens to a given number of the captured images; and a pre-processing unit, coupled to the memory unit, the pre-processing unit arranged for perform a pre-processing operation upon the sensing results, to generate a plurality of processed sensing results, wherein each of the processed sensing results comprises a plurality of characteristic values corresponding to the sensing units respectively;

wherein the memory unit stores the characteristic values, and the numerical analysis unit generates the testing result indicative of performance of the image sensor according to changing of the characteristic values;

wherein for each of the sensing units, the numerical analysis unit calculates a changing ratio of a characteristic value corresponding to the sensing unit in the sensing results; and the numerical analysis unit generates the testing result according to a number of sensing units each having a corresponding changing ratio falling within a specific interval;

wherein for each of the sensing units, the numerical analysis unit calculates a difference between the changing ratio and a predetermined ratio to generate a ratio difference corresponding to the sensing units, and calculates an absolute value of the ratio difference; and the numerical analysis unit generates the testing result according to a number of sensing units each having a corresponding absolute value falling within a difference interval.

9. The testing apparatus of claim 8, wherein the pre-processing unit comprises:

a filtering unit, arranged for performing a filtering process upon the sensing results;

a binarization unit, coupled to the filtering unit, the binarization unit arranged for performing a binarization process upon the sensing results processed by the filtering unit to generate the processed sensing results.

10. The testing apparatus of claim 8, wherein the numerical analysis unit generates the testing result according to the calculated number and a predetermined number.

11. The testing apparatus of claim 10, wherein the image sensor performs image capturing upon different areas to generate a plurality of captured images, and sets the predetermined number according to a statistical result of changing between the capture images.

12. The testing apparatus of claim 8, wherein while the image sensor is moving, the image sensor performs image capturing upon different areas to generate the sensing results respectively.

13. The testing apparatus of claim 8, wherein when the image sensor is fixed, the image sensor performs image capturing upon a same area to generate the sensing results.

14. The testing apparatus of claim 8, further comprising:

a parameter adjusting unit, coupled to the numerical analysis unit, the parameter adjusting unit arranged for adjusting a setting value of the image sensor according to the testing result.

* * * * *